(12) United States Patent
Fan

(10) Patent No.: US 11,254,253 B1
(45) Date of Patent: Feb. 22, 2022

(54) CARRYING BRACKET FOR CUP HOLDER USED IN VEHICLES

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 17/142,272

(22) Filed: Jan. 6, 2021

(51) Int. Cl.
*B60N 3/00* (2006.01)
*B60N 3/10* (2006.01)

(52) U.S. Cl.
CPC ............. *B60N 3/103* (2013.01); *B60N 3/106* (2013.01); *B60N 3/108* (2013.01)

(58) Field of Classification Search
None
See application file for complete search history.

(56) References Cited

U.S. PATENT DOCUMENTS

| | | | | |
|---|---|---|---|---|
| 5,791,618 A | * | 8/1998 | Lancaster | B60N 3/106 248/311.2 |
| 5,839,711 A | * | 11/1998 | Bieck | B60N 3/106 248/313 |
| 2010/0090079 A1 | * | 4/2010 | Choi | B60N 3/106 248/311.2 |
| 2010/0200720 A1 | * | 8/2010 | Kaemmer | B60N 3/106 248/311.2 |
| 2012/0153113 A1 | * | 6/2012 | Voigt | B60N 3/105 248/316.7 |
| 2014/0158852 A1 | * | 6/2014 | Andersson | B60N 3/102 248/346.03 |
| 2018/0105089 A1 | * | 4/2018 | Inoue | B60N 3/106 |

* cited by examiner

*Primary Examiner* — Steven M Marsh
(74) *Attorney, Agent, or Firm* — Lin & Associates Intellectual Property, Inc.

(57) ABSTRACT

A carrying bracket for a cup holder used in vehicles is provided, including: a base unit, a rotating unit, and a plurality of expansion units; the outer wall of the base unit being disposed with a plurality of through holes; the rotating unit being mounted on the base unit and rotatable without detachment, the rotating unit having a spiral guide groove facing the base unit; the expansion units being installed in the base unit through the through holes at corresponding positions, and the expansion unit comprising a moving part and a wall support; the wall support for installing the moving part with adjustable position to change the length of the expansion unit; each moving part having a guide block and the plurality of guide blocks all located in the spiral guide groove. When the rotating unit rotates, each moving part moves linearly and protruding outward through the through hole.

10 Claims, 14 Drawing Sheets

CARRYING BRACKET FOR CUP HOLDER USED IN VEHICLES

BACKGROUND OF THE INVENTION

1. Field of the Invention

The present invention relates generally to a carrying bracket, and more particularly, to a carrying bracket to be fixed to the cup holder used in a vehicle for mounting other accessories.

2. The Prior Arts

Every vehicle is provided with at least a set of cup holders for drivers or passengers to place canned drinks or coffee cups. However, with the popularity of electronic products, the old design used in vehicles is no longer suitable for use. Some manufacturers have designed a carrying bracket to be installed on the cup holder, and the carrying bracket provides additional clamping devices, extension platforms, larger cup holders, etc., for drivers or passengers to hold mobile phones or for other purposes.

The common carrying bracket generally uses a plurality of outwardly expandable support members to tightly contact the inner wall of the cup holder to achieve a fixing effect. However, different types of vehicles may provide different sizes of the cup holders. Therefore, the carrying bracket is usually only suitable for cup holders within a small size range. For manufacturers, the provision of different sets of carrying brackets to accommodate cup holders of different sizes is a big burden on development costs. For the user, if the car is replaced, the old carrying bracket cannot be used and must be purchased again, which is not cost-effective. For this reason, the inventor of the present invention proposes an improved structure

SUMMARY OF THE INVENTION

To solve the above problems, the primary objective of the present invention is to provide a carrying bracket for the cup holder used in vehicles, which is mainly provided with an expansion unit that can adjust the length and increase the applicable size, and can still achieve a good pressing effect, so as to bring excellent convenience and reduce costs for users or manufacturers.

In order to achieve the aforementioned objective, the present invention utilizes the following technical solutions:

The present invention is a carrying bracket for cup holder used in vehicles, including: a base unit, a rotating unit, and a plurality of expansion units; the outer wall of the base unit being disposed with a plurality of through holes; the rotating unit being mounted on the base unit and rotatable without detachment, the rotating unit having a spiral guide groove facing the base unit; the expansion units being installed in the base unit through the through hole at corresponding positions, and the expansion unit comprising, from inside to outside, a moving part and a wall support; the wall support for installing the moving part with adjustable position, after adjustment, the length of the expansion unit being changed; each moving part having a guide block and the plurality of guide blocks all located in the spiral guide groove, and when the rotating unit rotating, each of the moving parts linearly moving and protruding outward through the corresponding through hole.

In a preferred embodiment, the moving part has at least two sets of latch slots, each set of the latch slots is distributed on two corresponding vertical walls of the moving part, and the wall support also comprises a U-shaped sheath element, the sheath element has a convex strip on two opposite inner walls, and the wall support is fixed to the moving part when the convex strip is inserted into the latch slot.

In a preferred embodiment, the latch slot has at least one convex point, the convex strip also has the same number concave notches at corresponding positions of concave notches, when the convex strip is inserted into the latch slot, the convex points are also located inside the corresponding notches.

In a preferred embodiment, the base unit has a plurality of guide channels, each of the guide channels corresponds to the through hole, when the rotating unit rotates, the moving part moves in the guide channel and extends through the through hole.

In a preferred embodiment, a holder is installed in the base unit, the holder has a plurality of sliding grooves, and each of the moving parts also has a holding block, the holding block protruding from the bottom of the moving part and is located in the sliding grooves of the holder when assembled.

In a preferred embodiment, the base unit has a receiving base with an opening facing upward, the bottom of the rotating unit has a round piece, and the spiral guide groove is formed on an end surface of the round piece facing the base unit, the round piece rotates in the receiving base.

In a preferred embodiment, a screw rod is installed in the center of the base unit, and the screw rod penetrates the rotating unit and is locked to the base unit, so that the rotating unit is rotatable but not disengaged from the base unit.

In a preferred embodiment, the outer wall of the top of the base unit further comprises a pivotal circular wall, and the pivotal circular wall comprises a plurality of longitudinal protruding teeth.

In a preferred embodiment, the present invention further comprises a rotating bracket, the rotating bracket has a C-shaped butt clamp, the inner wall of the butt clamp comprises a plurality of vertically distributed tooth grooves, when the rotating bracket is clamped by the butt clamp on the pivotal circular wall, and the protruding teeth are located in the tooth grooves.

Compared with the prior art, the present invention has the following specific effects:
1. The expansion unit of the present invention is composed of the moving part and the wall support. By adjusting the position of the wall support at the moving part, the radial length of the expansion unit can be changed, thereby expanding the applicable size of cup holders.
2. The present invention is easy to operate, easy to use and can be widely used in various products.
3. The present invention can be used with a set of rotating brackets for connecting various accessories of different types, which are convenient for users to choose.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
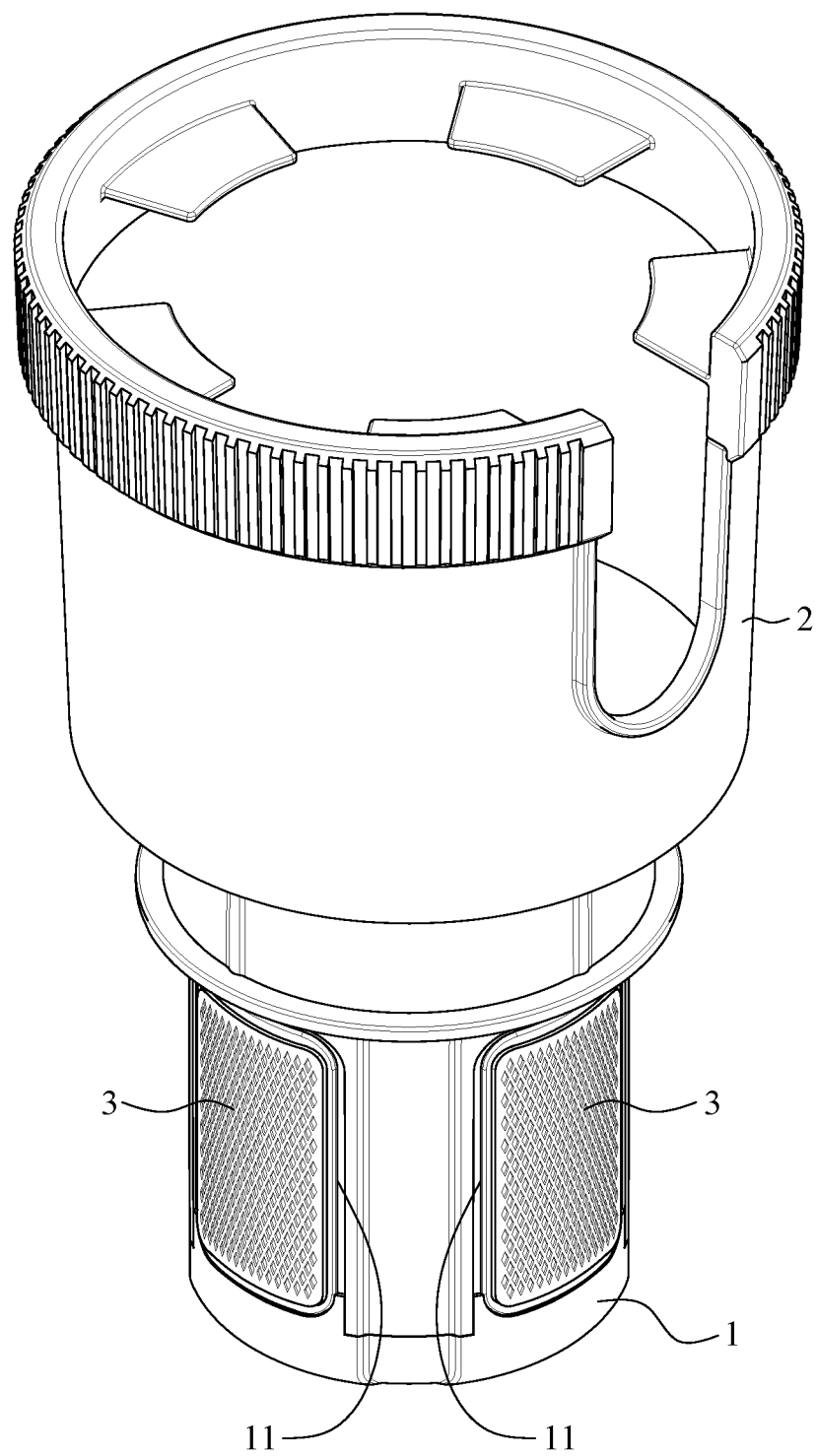
FIG. 1 is a perspective view of the first embodiment of the carrying bracket for the cup holder used in vehicles according to the present invention.
Figure 2:
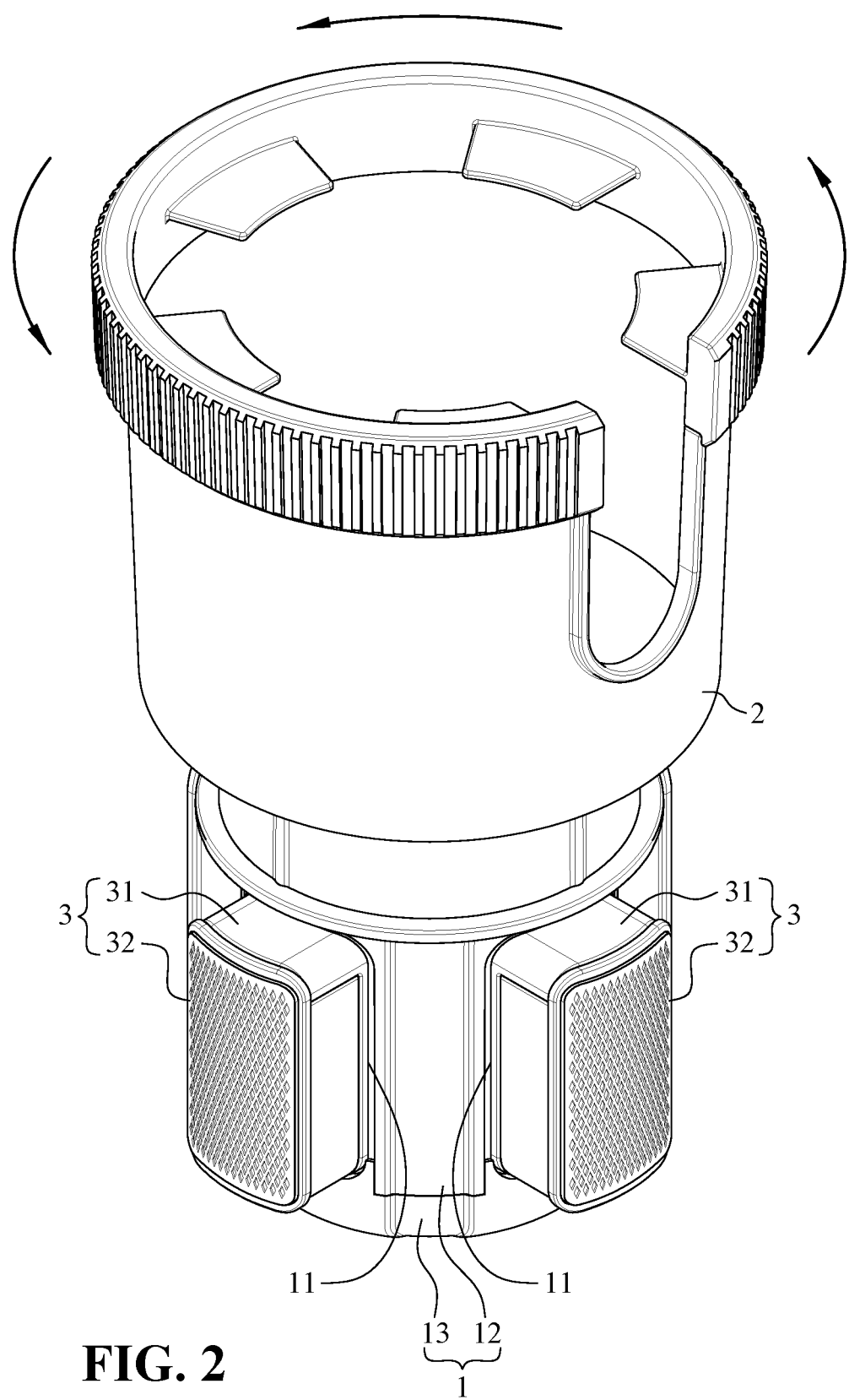
FIG. 2 is a perspective view of the first embodiment of the carrying bracket for the cup holder used in vehicles according to the present invention in the expanded state.
Figure 3:
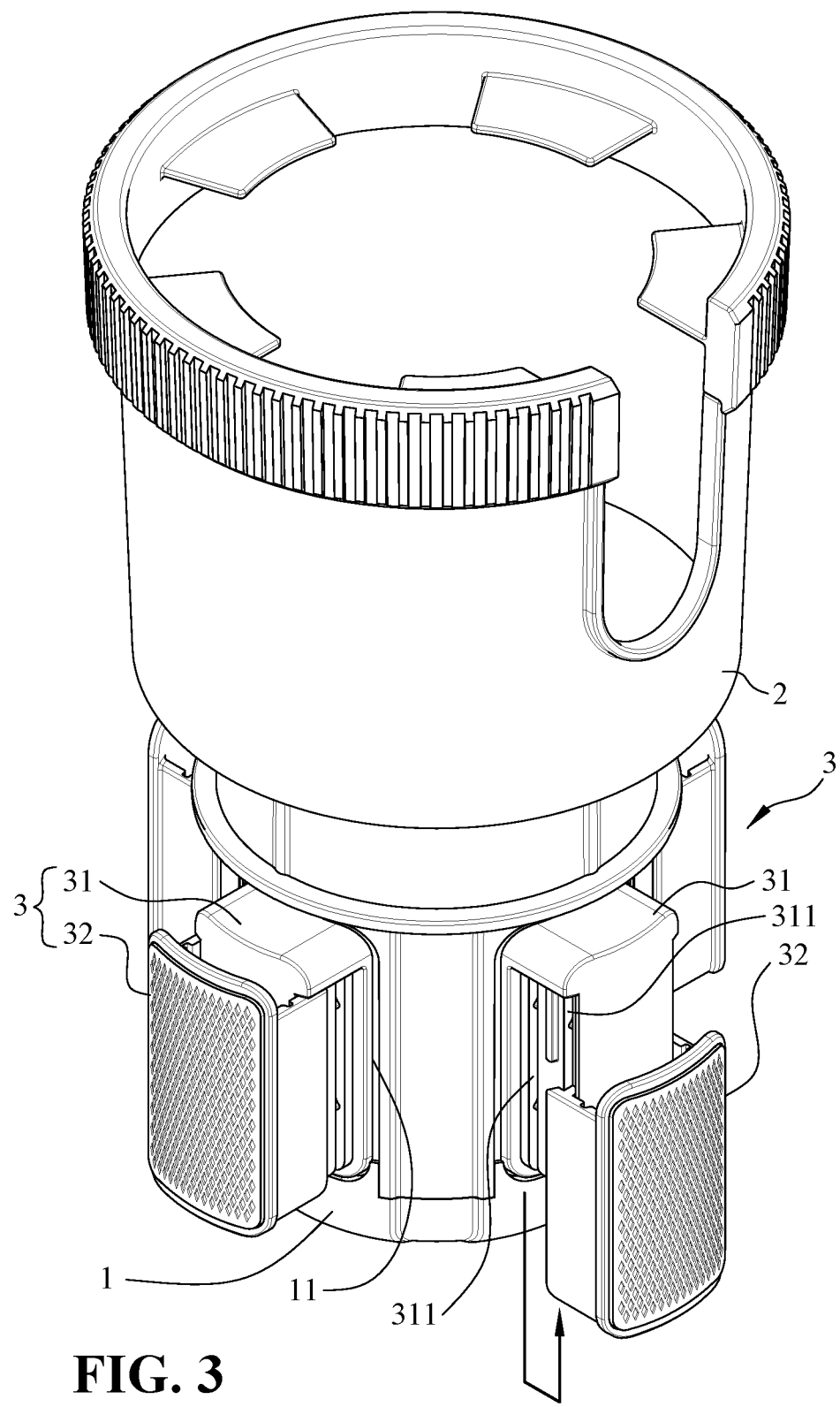
FIG. 3 is a perspective view of the first embodiment of a carrying bracket for a cup holder used in vehicles according to the present invention in the expanded state to the largest dimension.

Referring to FIG. 1 and FIG. 2, FIG. 1 is a perspective view of the first embodiment of the carrying bracket for the cup holder used in vehicles according to the present invention; FIG. 2 is a perspective view of the first embodiment of the carrying bracket for the cup holder used in vehicles according to the present invention in the expanded state. The carrying bracket for the cup holder used in vehicles of the present invention includes a base unit 1, a rotating unit 2 and a plurality of expansion units 3. The outer wall of the base unit 1 is disposed with a plurality of through holes 11 arranged in a ring manner; the rotating unit 2 is mounted on the base unit 1, and can rotate but not detach from the base unit 1. The plurality of the expansion units 3 are installed in the base unit 1 through the through holes 11 at corresponding positions. When the rotating unit 2 rotates, the plurality of expansion units 3 can move linearly and extend outward through the corresponding through holes 11 (as shown in FIG. 2). When in use, the base unit 1 is placed in a cup holder in the car, and the expansion unit 3 moves outwards to achieve tight fixation. In addition, the expansion unit 3 is formed by sheathing a moving part 31 and a wall support 32. When the wall support 32 is adjusted the installation position of the moving part 31, the length of the expansion unit 3 extending outward can be increased (as shown in FIG. 3), thereby expanding the size suitable for the cup holder. In the present embodiment, the rotating unit 2 provides a large-sized cup holder, but is not limited to the above. The present invention can also be directly designed with the required shape or installed with various accessories, such as a platform, a flexible hose bracket, or clamping device, and so on, to achieve other different usages, which will be described in the following embodiments.

Figure 4:
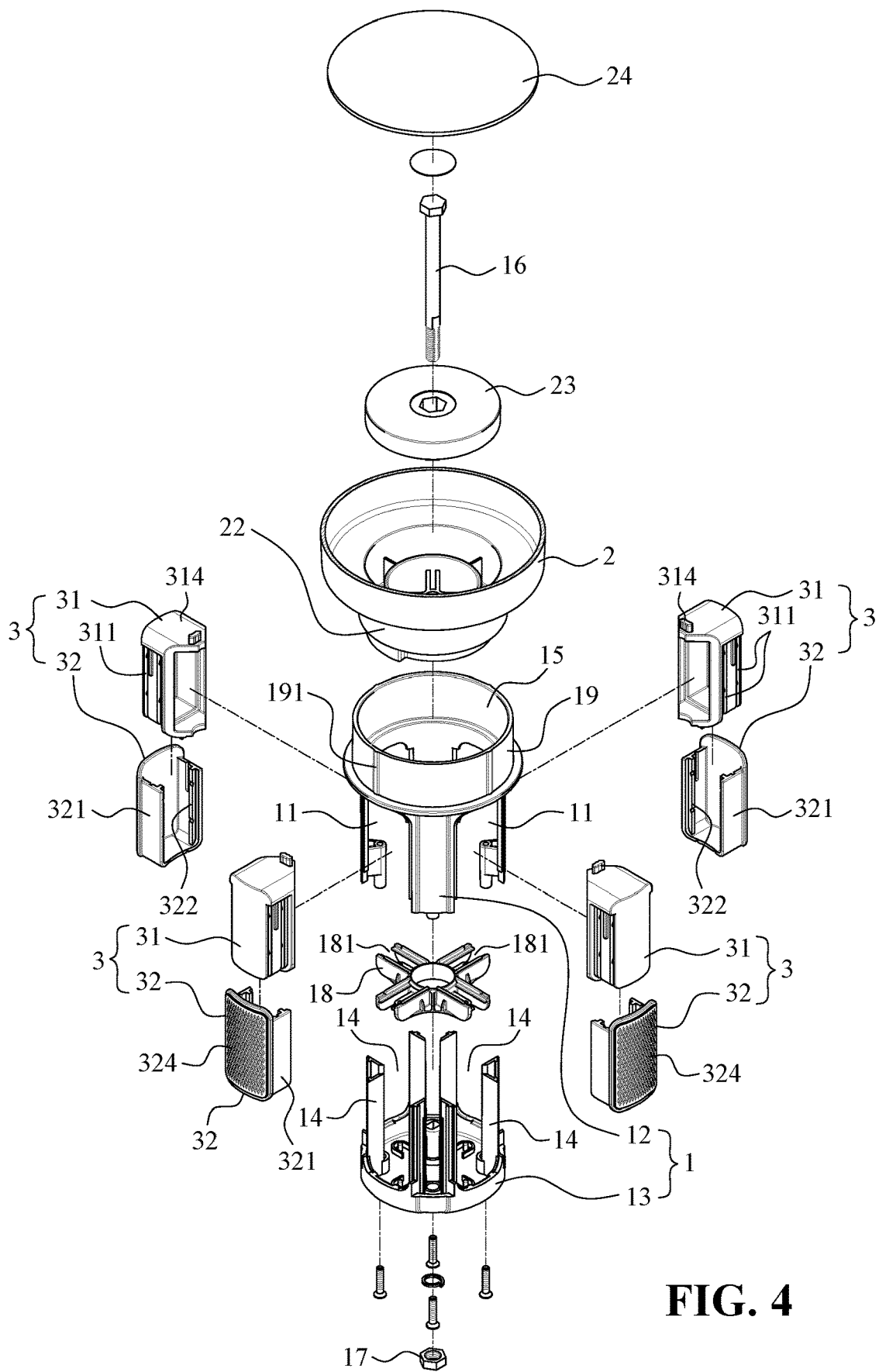
FIG. 4 is an exploded view of the first embodiment of the carrying bracket for the cup holder used in vehicles according to the present invention, with only part of the structure of the rotating unit drawn.

The following first gives a detailed description of the structure of each component. FIG. 4 is an exploded view of the present invention, wherein only a part of the rotating unit 2 is drawn, and FIG. 5 shows an enlarged schematic view of the main component:

The base unit 1 is a cylindrical base with an opening facing upward, and a plurality of through holes 11 is disposed around the outer wall. The base unit 1 may comprise one or more components. In the present embodiment, the base unit 1 comprises a shell 12 and a base 13, and the plurality of through holes 11 are formed on the outer circumferential wall after the shell 12 and the base 13 are assembled. In addition, a plurality of guide channels 14 is formed at the base 13 by a plurality of upright walls, and each guide channel 14 corresponds to one through hole 11 after assembly. The expansion unit 3 can move in the guiding channel 14 and extend outward through the through hole 11. A receiving base 15 is formed in the upward opening of the shell 12, and the receiving base 15 is for installing and rotating the rotation unit 2 herein. The base unit 1 is additionally provided with a screw rod 16, which penetrates the rotating unit 2 and the base 13 from top to bottom during assembly, and a nut 17 locks the bottom end of the screw rod 16 to fix the position of the shell 12 together with the base 13. However, the rotating unit 2 is rotatable but will not be separated from the base unit 1. In addition, the base unit 1 can be optionally disposed with a holder 18 in the base 13. The holder 18 has a plurality of sliding grooves 181, and the plurality of sliding grooves 181 are arranged like a cross. The sliding grooves 181 are used to assist the expansion unit 3 to move smoothly. The base unit 1 has a pivotal circular wall 19, located on the outer wall of the shell 12 close to the top. The pivotal circular wall 19 further comprises several longitudinal protruding teeth 191. The pivotal circular wall 19 is for other accessories to be installed herein, which will be described in later embodiments.

Figure 6:
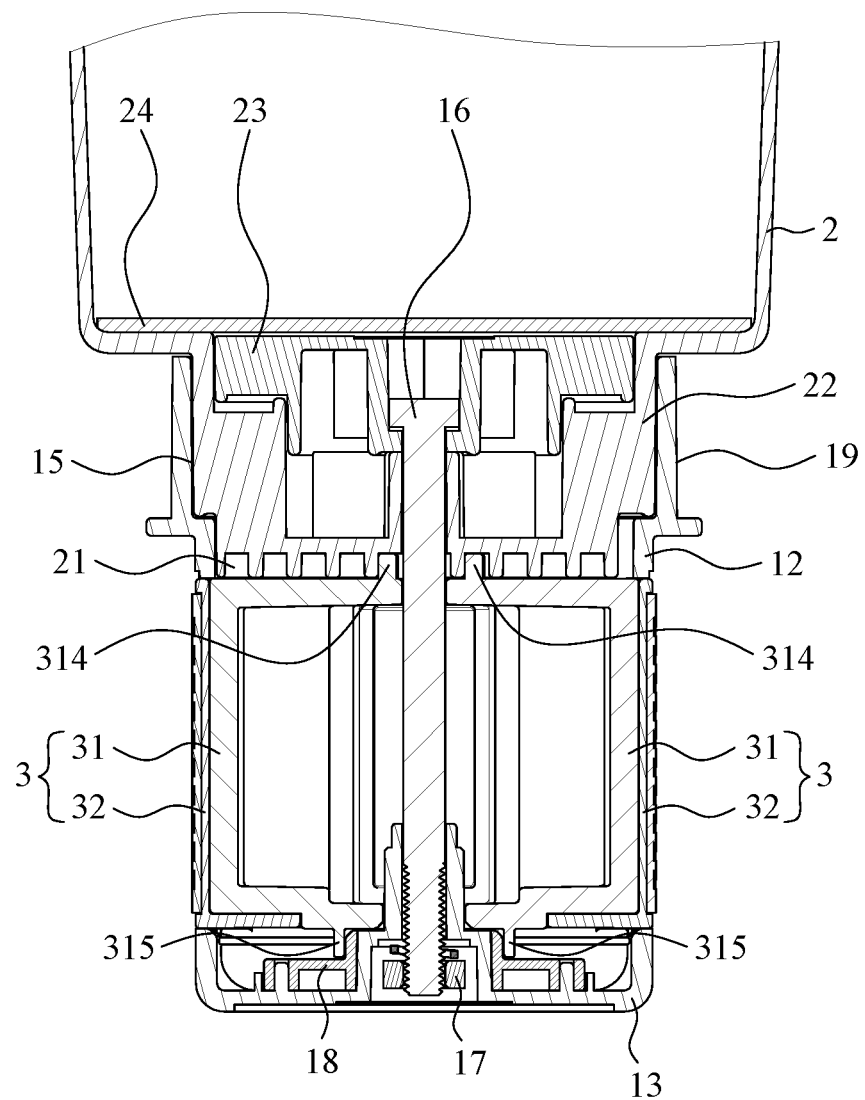
FIG. 6 is a cross-sectional view of the first embodiment of the carrying bracket for the cup holder used in vehicles according to the present invention.

The rotating unit 2 has a spiral guide groove 21 facing the base unit 1. In the present embodiment, the bottom of the rotating unit 2 has a smaller round piece 22, and the spiral guide groove 21 is formed at the end surface of the round piece 22 facing the base unit 1. After assembling, the round piece 22 rotates in the receiving base 15. In the present embodiment, the upper half of the rotating unit 2 is a large-sized cup holder, and the lower half is designed according to usage requirements. Herein, one of the embodiments is provided for explanation. The lower half of the rotating unit 2 includes a matching piece 23 and a round plate 24. The matching piece 23 is installed in the round piece 22 for the screw rod 16 to penetrate the matching piece 23 and then extend downward to be locked. The round plate 24 is attached to the inside of the rotating unit 2, as shown in FIG. 6. When the rotating unit 2 rotates, the round plate 24 and the round piece 22 are rotated synchronously, but the matching piece 23 and the screw rod 16 are fixed.

Figure 5:
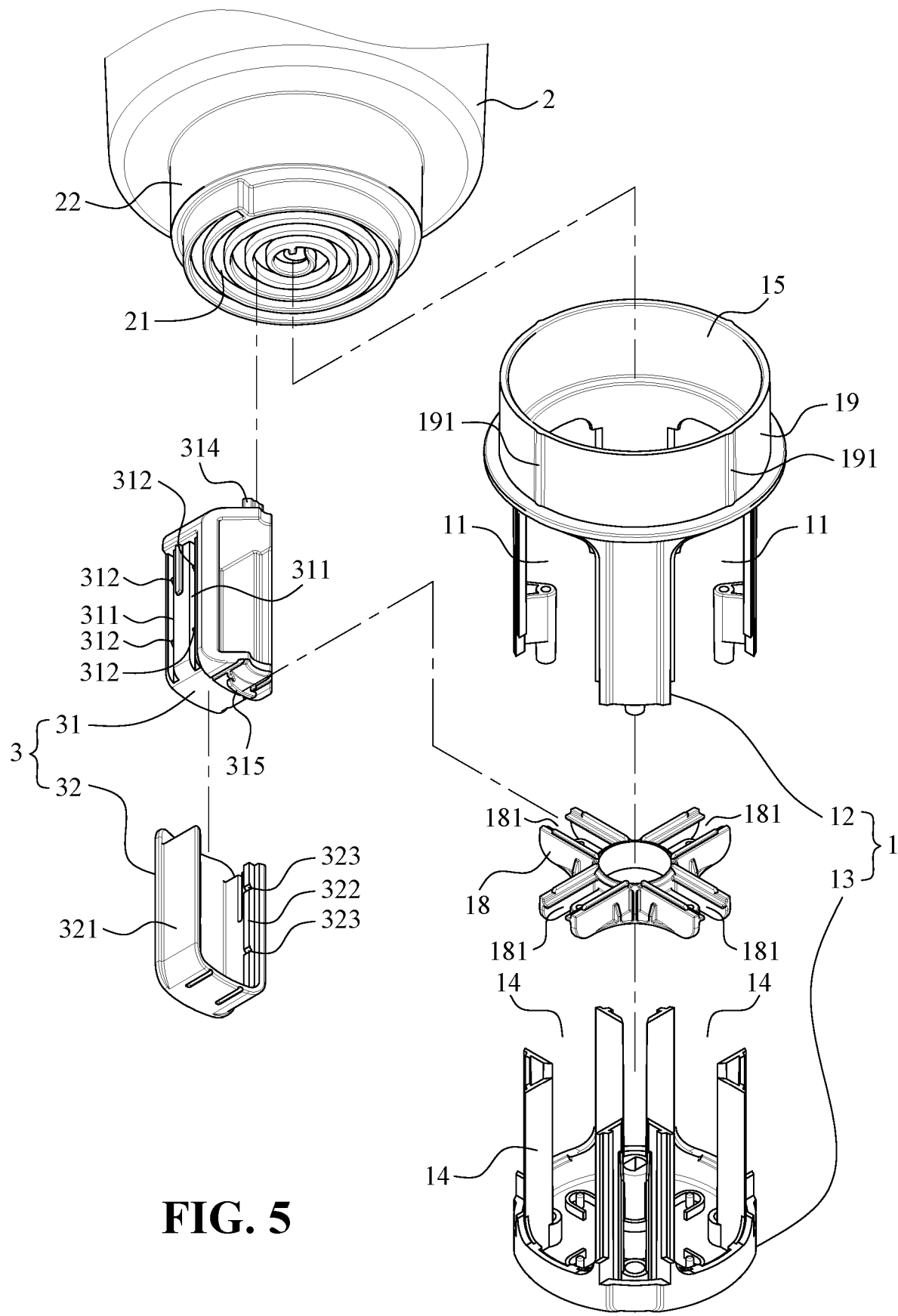
FIG. 5 is an enlarged schematic view of part of the components of the first embodiment of the carrying bracket created for the cup holder used in vehicles according to the present invention, with only one set of the expansion unit drawn.

Refer to FIG. 5. The expansion unit 3 is in the shape of a three-dimensional rectangular shell, which includes, from inside to outside, a moving part 31 and a wall support 32. The wall support 32 is installed on the moving part 31 and can be adjusted in position, thereby changing the length of the expansion unit 3 and expanding the applicable size range of the cup holder. Therefore, the moving part 31 has at least two sets of latch slots 311, and each set of the latch slots 311 is distributed on two opposite two vertical walls of the moving member 31. Preferably, one of the latch slots 311 is located at the position where the moving part 31 is closest to the base unit 1, and the other latch slot 311 is far away from the base unit 1. The wall support 32 has a U-shaped sheath element 321. The sheath element 321 has a convex strip 322 on each of the facing inner walls. When the convex strip 322 is inserted into the latch slot 311, the wall support 32 is fixed to the moving part 31. In addition, to prevent from loosening, the latch slot 311 is provided with at least one convex point 312, and the convex strip 322 also has the same number of the concave notch 323 at positions corresponding to the convex points. When the convex strip 322 is inserted into the latch slot 311, the convex point 312 will also be located in the concave notch 323.

Figure 7A:
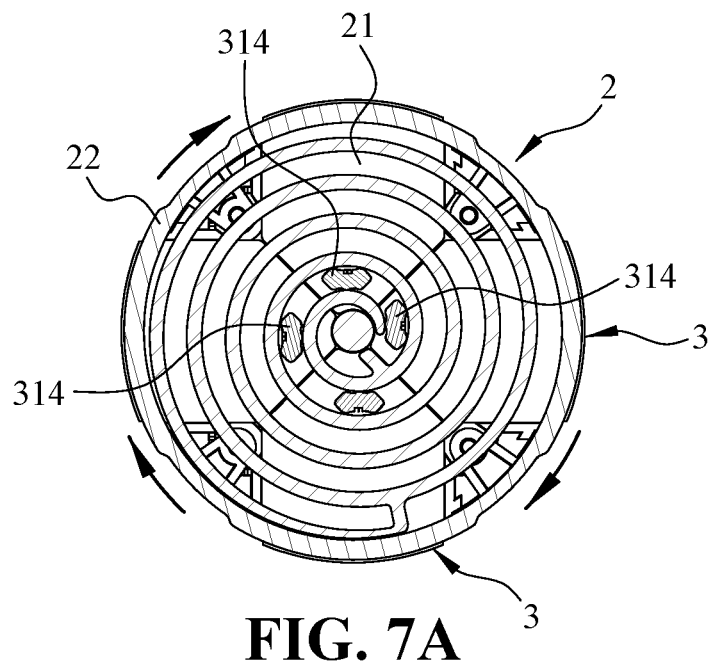
FIG. 7A is a transverse cross-sectional view of the first embodiment of the carrying bracket for the cup holder used in vehicles according to the present invention, with the expansion unit not expanded.
Figure 7B:
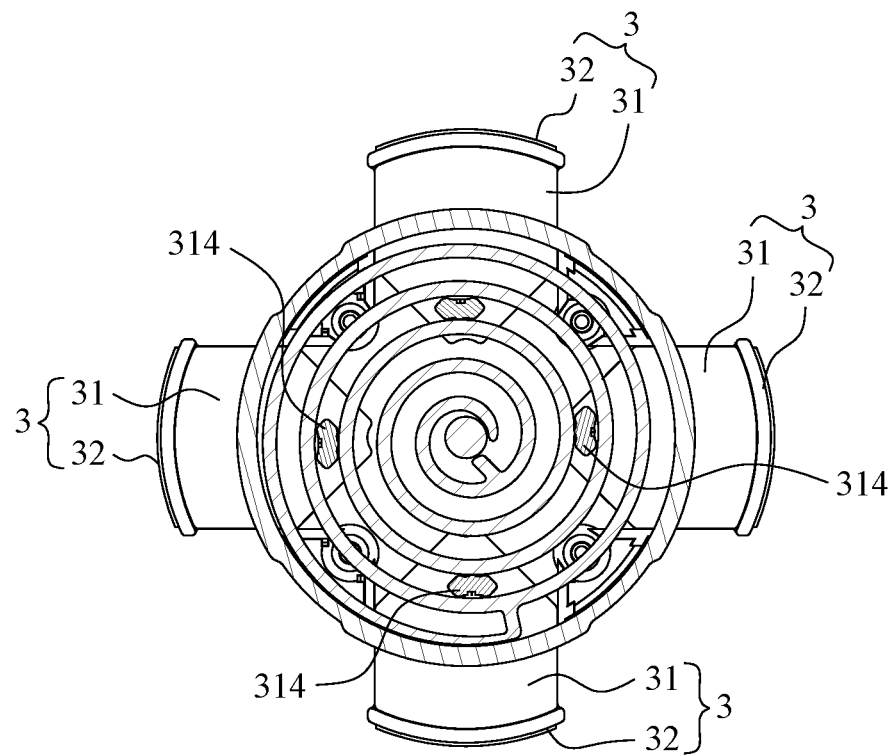
FIG. 7B is a transverse cross-sectional view of the first embodiment of the carrying bracket for the cup holder used in vehicles according to the present invention, with the expansion unit expanded.

The moving part 31 further comprises a guide block 314 and a holding block 315. The guide block 314 protrudes from the top of the moving part 31 and is located in the spiral guide groove 21 during assembly. The holding block 315 protrudes from the bottom of the moving part 32 and is located in the sliding groove 181 of the holder 18 during assembly. During assembly, each expansion unit 3 is installed in the guide channel 14, and the guide block 314 is located in the spiral guide groove 21, as shown in FIG. 7A. When the rotating unit 2 rotates, the guide block 314 moves along the spiral guide groove 21, and each moving part 31 can move linearly and extend out through the corresponding through hole 11, as shown in FIG. 7B. In addition, the sliding of the holding block 315 in the sliding groove 181 also assists the moving part 31 to move more smoothly. The outer wall of the wall support 32 facing outward is provided with a non-slip pad 324 to increase the friction at contacting the inner wall of the cup holder.

From the above description, it can be seen that the carrying bracket of the present invention is installed on the cup holder used in the car, and the rotating unit 2 on the base unit 1 can be rotated to drive the expansion unit 3 from the base unit 1 to extend from inside to outside, as shown in FIG. 2 to achieve pressing on the inner wall of the cup holder. When the size of the cup holder is too large, the expansion unit 3 needs to be expanded to the maximum state, then the wall support 32 is pulled downwards to exit the moving part 3, as shown in FIG. 3, and then use the convex strip 322 to align with the outermost latch slot 311 and then inserted, so that the position of the wall support 32 on the moving part 31 can be changed. The subsequent operation mode is the same as before. The rotating unit 2 is rotated to partially retract the expansion unit 3 in the base unit 1, and then placed on the cup holder before rotating the rotating unit 2 to expand.

The design of the present invention is widely applicable to various products. For example, the partial structure of the rotating unit 2 can be changed into a variety of different embodiments. The actual specific embodiments will be explained as follows. As shown in FIG. 2, the rotating unit 2 is a large-sized cup holder. As such, the carrying bracket of the present invention is installed at the cup holder. Instead of losing a cup holder, the present invention can provide a large-sized cup holder to meet the needs of users. In this embodiment, a mug can be placed.

Figure 8:
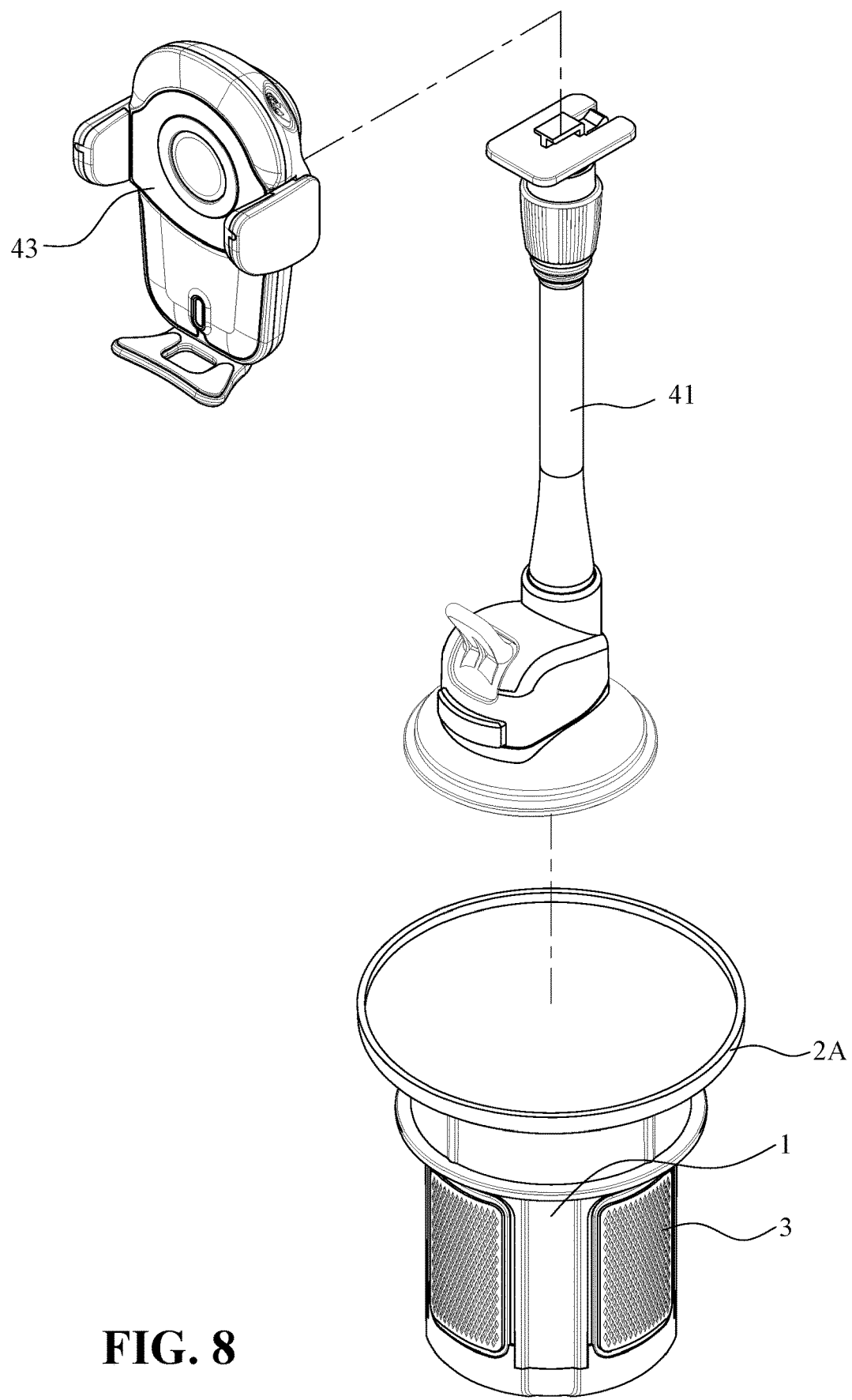
FIG. 8 is a schematic view of the second embodiment of the carrying bracket for the cup holder used in vehicles according to the present invention.

As shown in FIG. 8, the top of the rotating unit 2A is a platform, on which a suction cup holder 41 can be attached onto, and a clamping device 43 is mounted on the suction cup holder 41 to provide a hands-free device for mobile phone.

Figure 9:
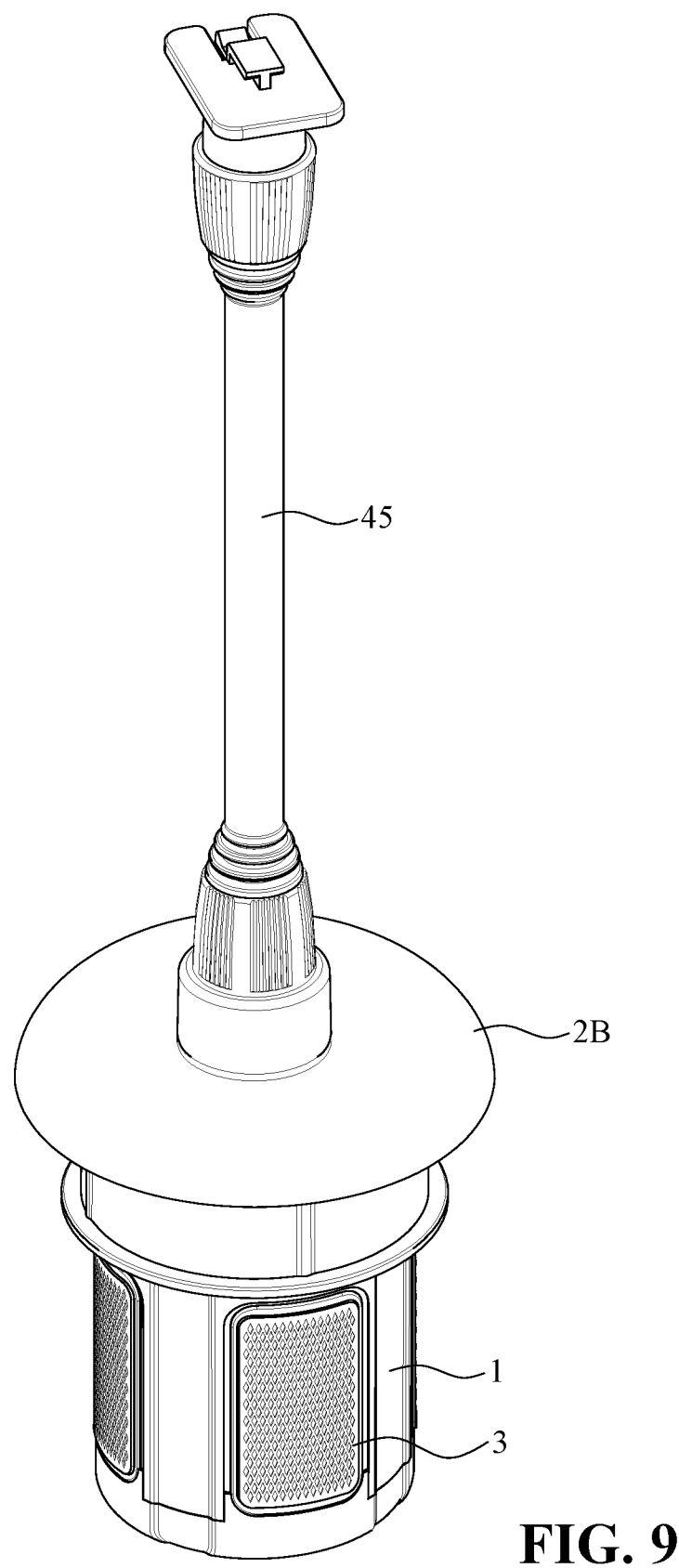
FIG. 9 is a schematic view of the third embodiment of the carrying bracket for the cup holder used in vehicles according to the present invention.

FIG. 9 is the third embodiment of the present invention. The upper half of the rotating unit 2B is connected with a hose-type bracket 45, so that the hose-type bracket 45 can be installed with a clamping device for holding the mobile phone.

Figure 10:
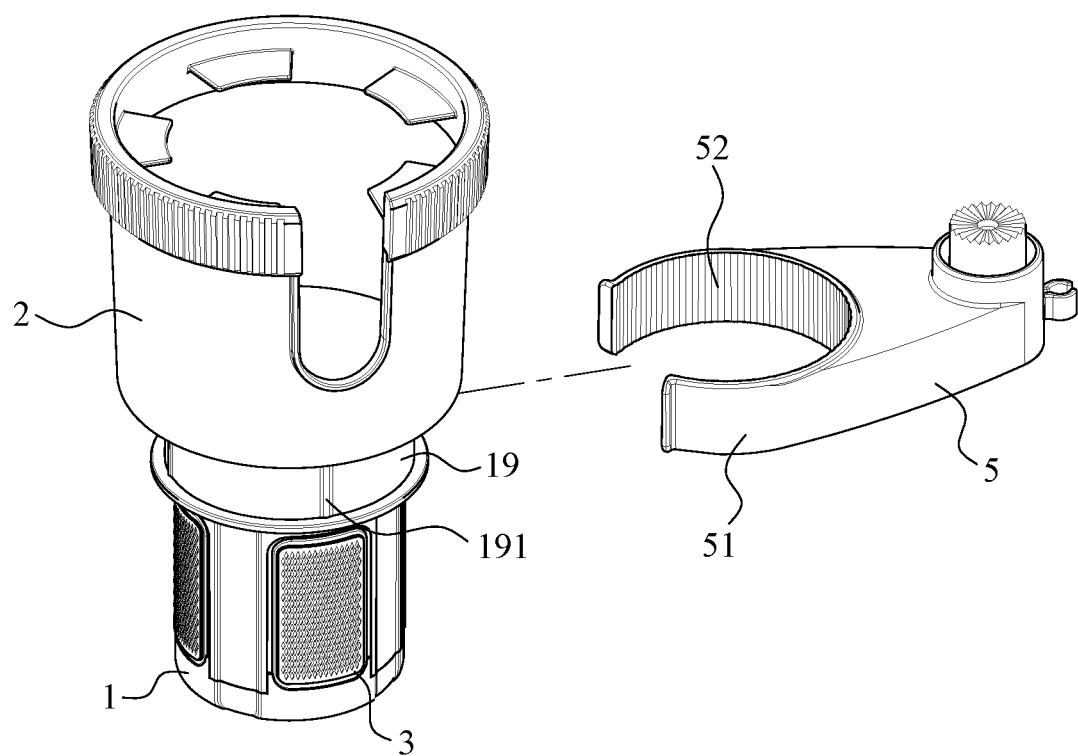
FIG. 10 is a schematic view of the fourth embodiment of the carrying bracket for the cup holder used in vehicles according to the present invention.

FIG. 10 is the fourth embodiment of the present invention. The carrying bracket for the cup holder used in vehicles further includes a rotating bracket 5 with a C-shaped butt clamp 51. The inner wall of the butt clamp 51 has a plurality of tooth grooves 52 distributed vertically. The rotating bracket 5 is clamped on the pivotal circular wall 19 by the butt clamp 51, and the position can be adjusted by rotation. When the protruding teeth 191 are located in the tooth grooves 52, the rotating bracket 5 can be positioned to prevent from rotating freely. The rotating bracket 5 can also be equipped with different accessories here to increase the scope of application of the product.

Figure 11:
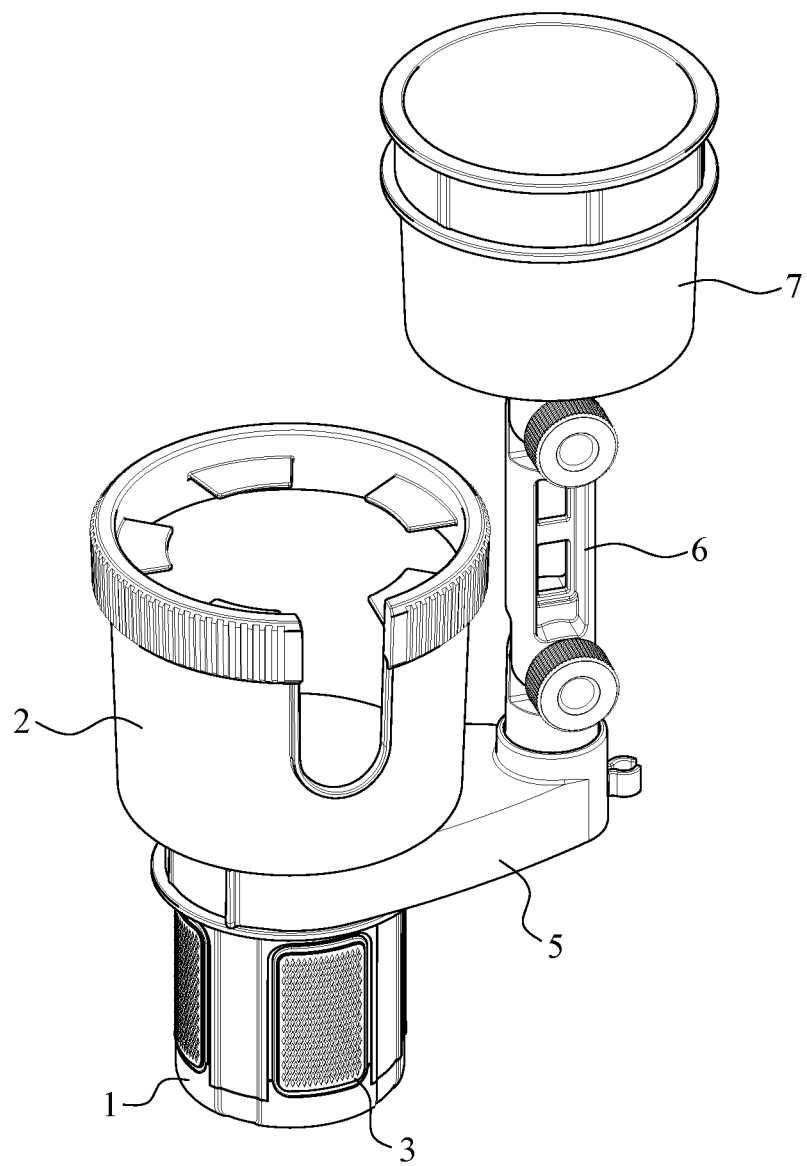
FIG. 11 is a schematic view of the fifth embodiment of the carrying bracket for the cup holder used in vehicles according to the present invention.

FIG. 11 is the fifth embodiment of the present invention. In the present embodiment, the rotating bracket 5 is connected to a set of joint components 6, and another small cup holder 7 can be mounted on the joint components 6. This design can meet the needs of users who need two sets of cup holders.

Figure 12:
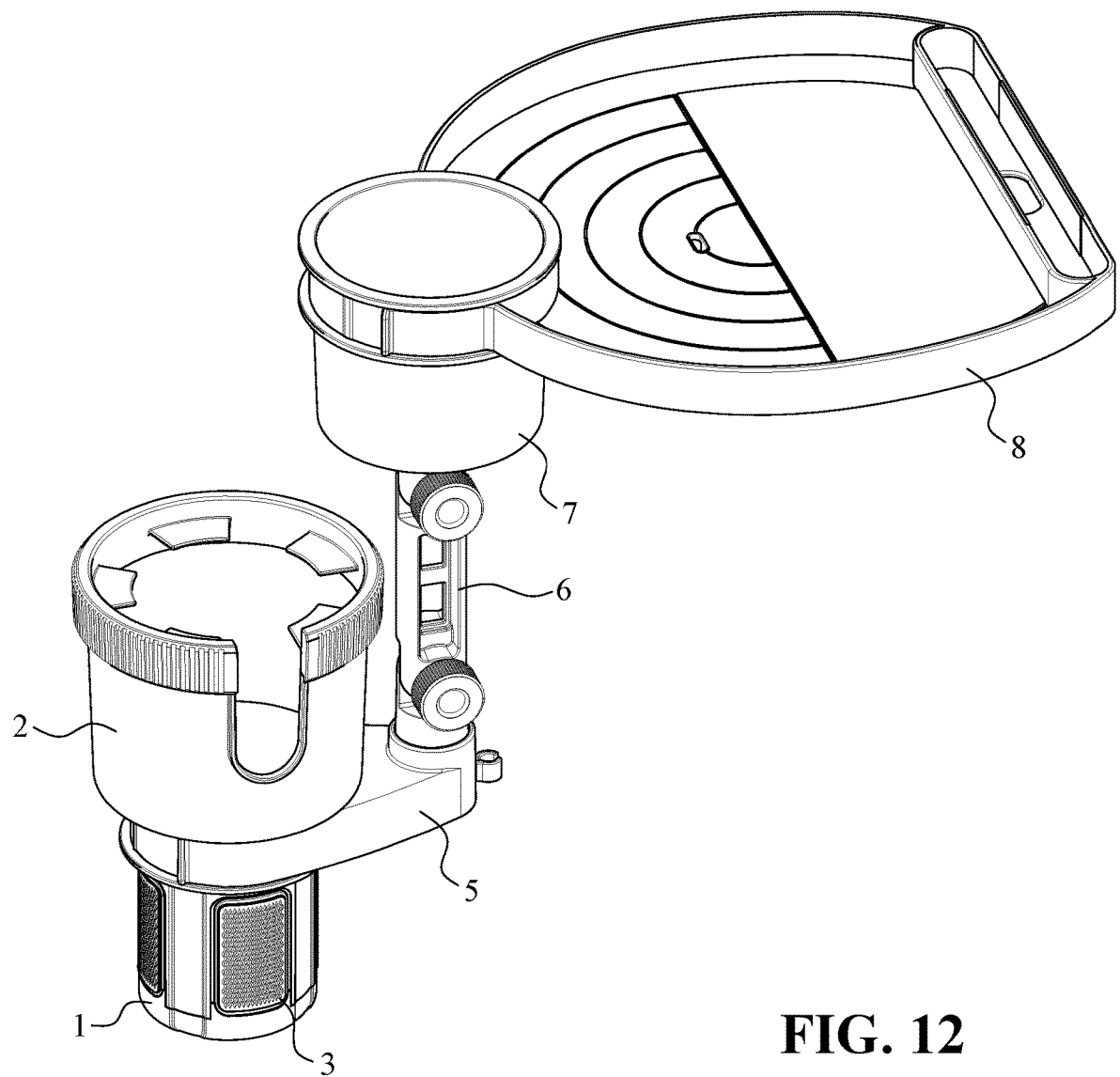
FIG. 12 is a schematic view of the sixth embodiment of the carrying bracket for the cup holder used in vehicles according to the present invention.

FIG. 12 is the sixth embodiment of the present invention. In the present embodiment, a set of receiving plates 8 can also be used. The receiving plates 8 can be installed on the small cup holder 7 to provide more platform surface for users.

Figure 13:
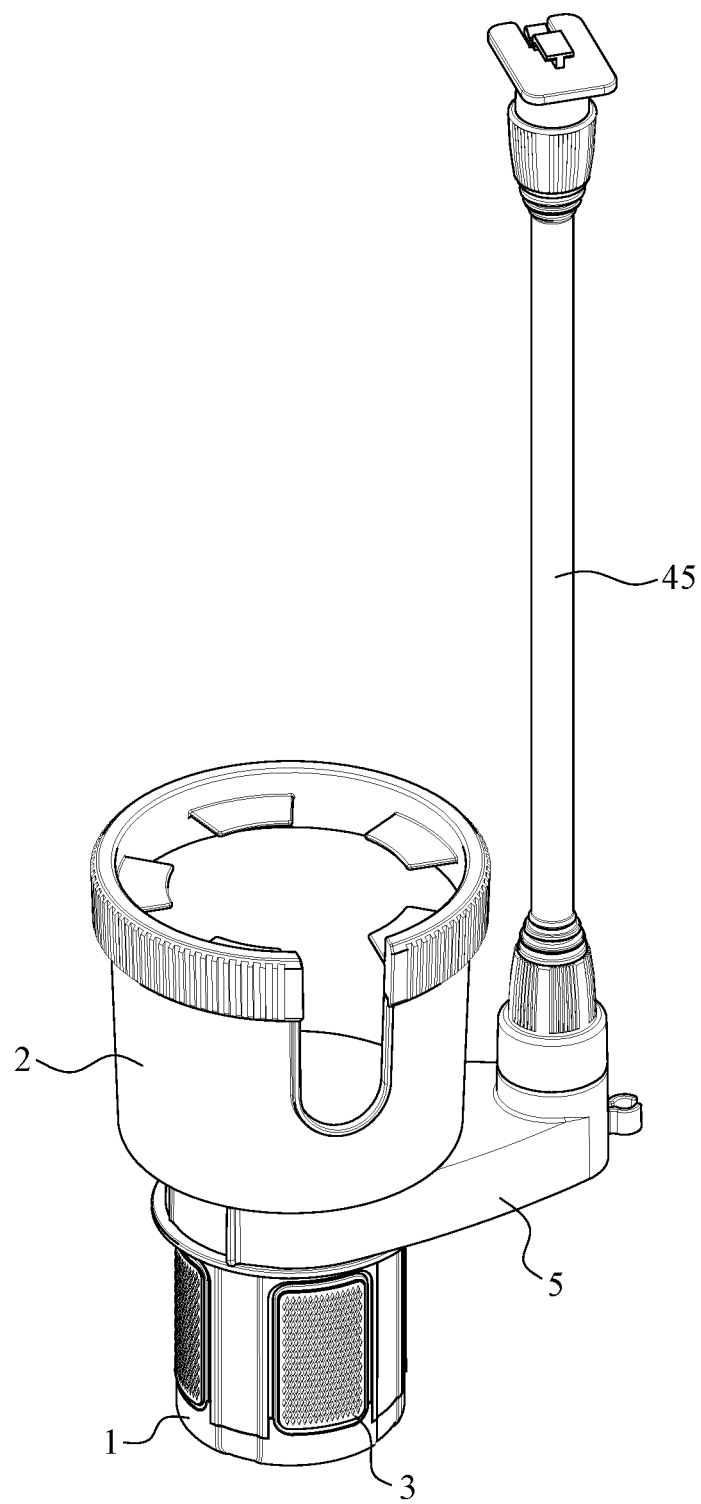
FIG. 13 is a schematic view of the seventh embodiment of the carrying bracket for the cup holder used in vehicles according to the present invention.

FIG. 13 is the seventh embodiment of the present invention. In the present embodiment, the rotating bracket 5 is connected to a set of hose brackets 45. The hose-type bracket 45 can be equipped with a clamping device for clamping the mobile phone.

Figure 14:
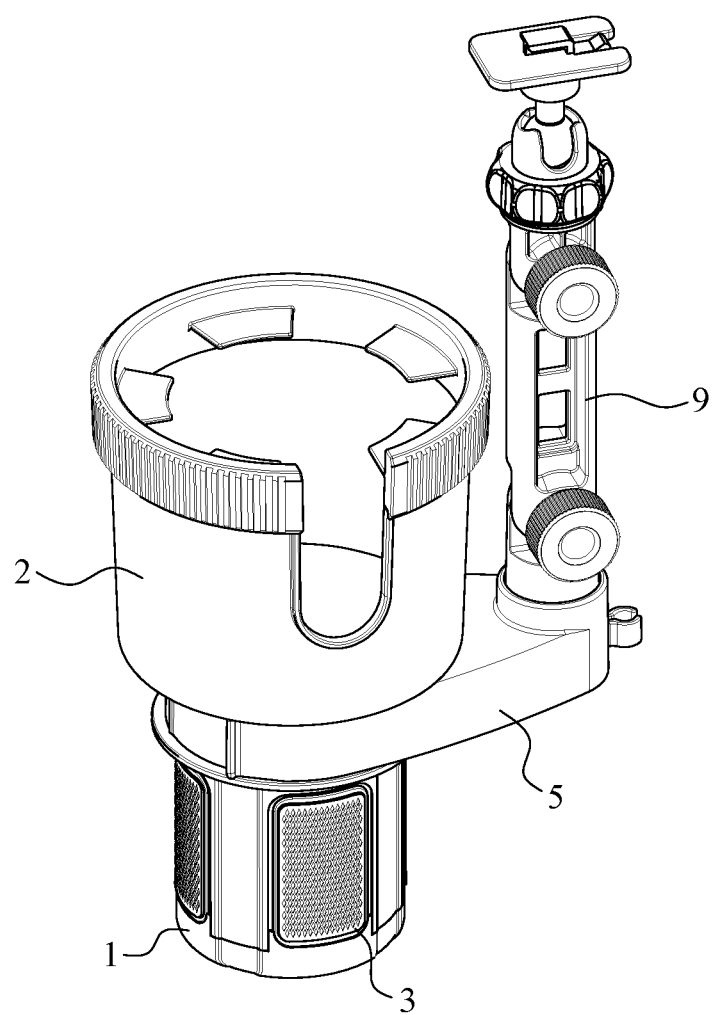
FIG. 14 is a schematic view of the eighth embodiment of the carrying bracket for the cup holder used in vehicles according to the present invention.

FIG. 14 is the eighth embodiment of the present invention. In the present embodiment, the rotating bracket 5 is also connected to a set of shorter bracket type joints 9 which can be equipped with a clamping device for clamping the mobile phone.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A carrying bracket for a cup holder used in vehicles, comprising:
    a base unit having an outer wall disposed with a plurality of through holes;

a rotating unit mounted on the base unit, the rotating unit having a spiral guide groove facing the base unit and being rotatable without disengagement; and a plurality of expansion units installed in the base unit through the plurality of through holes at corresponding positions, each of the expansion units comprising a moving part and a wall support for installing the moving part with an adjustable position, the moving part having a guide block located in the spiral guide groove and moving linearly and protruding outward through a corresponding through hole when the rotating unit rotates;

wherein a length of a respective expansion unit of the expansion units changes according to the adjustable position of the moving part of the respective expansion unit.

2. The carrying bracket for a cup holder used in vehicles according to claim 1, wherein the moving part of each of the expansion units has at least two sets of latch slots, each set of the latch slots is distributed on two corresponding vertical walls of the moving part, and the wall support of each of the expansion units also comprises a U-shaped sheath element, the sheath element has two convex strips respectively on two opposite inner walls, and the wall support is fixed to the moving part when the two convex strips are inserted into one set of the latch slots.

3. The carrying bracket for a cup holder used in vehicles according to claim 2, wherein each latch slot has at least one convex point, each convex strip also has at least one concave notch each corresponding to one of the at least one convex point, and when the convex strip is inserted into a corresponding latch slot, each of the at least one convex point is also located inside a corresponding one of the at least one concave notch.

4. The carrying bracket for a cup holder used in vehicles according to claim 1, wherein the base unit has a plurality of guide channels, each of the guide channels corresponds to one of the through holes, and when the rotating unit rotates, the moving part of each of the expansion units moves in a respective guide channel and extends through the through hole corresponding to the respective guide channel.

5. The carrying bracket for a cup holder used in vehicles according to claim 1, wherein a holder is installed in the base unit, the holder has a plurality of sliding grooves, the moving part of each of the expansion units also has a holding block, and the holding block protrudes from the bottom of the moving part and is located in the sliding grooves of the holder when assembled.

6. The carrying bracket for a cup holder used in vehicles according to claim 1, wherein the base unit has a receiving base with an opening facing upward, the bottom of the rotating unit has a round piece, the spiral guide groove is formed on an end surface of the round piece facing the base unit, and the round piece rotates in the receiving base.

7. The carrying bracket for a cup holder used in vehicles according to claim 1, wherein an anti-slip pad is disposed on an outer wall of the wall support of each of the expansion units.

8. The carrying bracket for a cup holder used in vehicles according to claim 1, wherein a screw rod is installed in a center of the base unit, and the screw rod penetrates the rotating unit and is locked to the base unit, so that the rotating unit is rotatable but not disengaged from the base unit.

9. The carrying bracket for a cup holder used in vehicles according to claim 1, wherein the outer wall of the top of the base unit further comprises a pivotal circular wall, and the pivotal circular wall comprises a plurality of longitudinal protruding teeth.

10. The carrying bracket for a cup holder used in vehicles according to claim 9, further comprising a rotating bracket, the rotating bracket having a C-shaped butt clamp, an inner wall of the butt clamp comprising a plurality of vertically distributed tooth grooves; when the rotating bracket is clamped by the butt clamp on the pivotal circular wall, the protruding teeth are located in the tooth grooves.

\* \* \* \* \*